J. HARTSEL.
Machine for Sharpening Cotton-Gin Saws.
No. 221,813.   Patented Nov. 18, 1879.
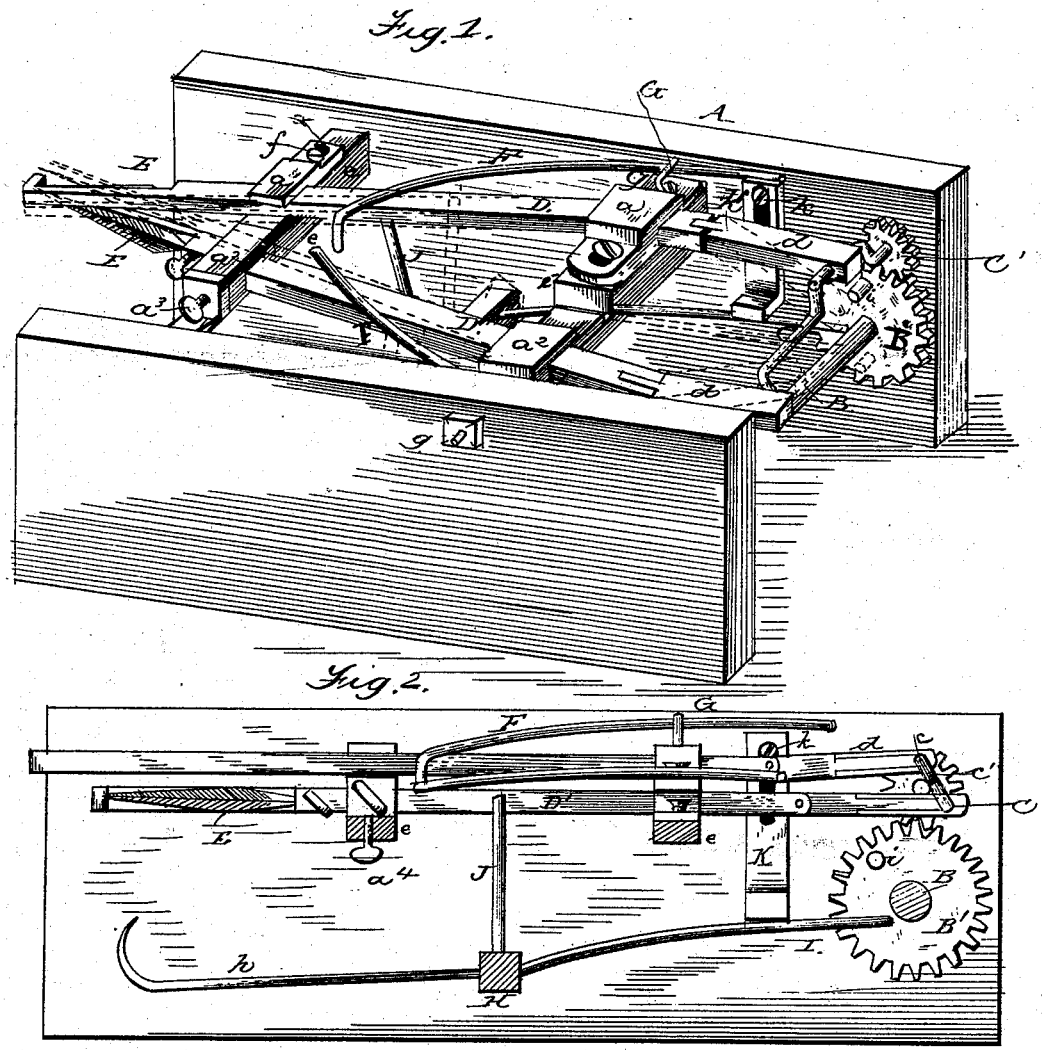

UNITED STATES PATENT OFFICE.

JACOB HARTSEL, OF BIG LICK, NORTH CAROLINA.

IMPROVEMENT IN MACHINES FOR SHARPENING COTTON-GIN SAWS.

Specification forming part of Letters Patent No. 221,813, dated November 18, 1879; application filed August 19, 1879.

*To all whom it may concern:*

Be it known that I, JACOB HARTSEL, of Big Lick, in the county of Stanly and State of North Carolina, have invented certain new and useful Improvements in Sharpeners for Cotton-Gin Saws; and I hereby declare the following to be a full, clear, and exact description thereof, reference being had to the accompanying drawings, making part of this specification, in which—

Figure 1 is a perspective view of the sharpener with the files changed and shown in dotted lines. Fig. 2 is a vertical sectional view.

My invention relates to certain new and useful improvements in the class of machines especially designed for sharpening cotton-gin saws; and my invention consists in the general construction and arrangement of parts, all as will be hereinafter more fully described and claimed.

To enable others skilled in the art to make and use my invention, I will proceed to describe the manner in which I have carried it out.

In the said drawings, A represents a suitable frame for supporting the operating mechanism. B represents the driving-shaft journaled in said frame, and provided with a crank at one end for turning it. B' represents a gear-wheel mounted on the shaft B, and which meshes with a gear-wheel, C', mounted on the double crank shaft C, journaled in the frame A, for operating said crank-shaft C. D D' represent two file-holders, connected to the crank-arms $c$ $c$ of the shaft C by the reciprocating jointed rods $d$ $d$. The file-holder D passes through two boxes, $a$ $a'$, mounted upon the cross-beams $e$ $e$, and the file-holder D' passes through two boxes, $a^2$ $a^2$, mounted in a different plane from boxes $a$ $a'$, so that the forward part of said holders can cross each other, as clearly shown in Fig. 1. E E represent the files mounted in the front end of the holders, and secured therein by screws, in the usual manner. The front box, $a^2$, through which the file-holder D' passes, has a set-screw, $a^3$, to adjust the holder horizontally, and another set-screw, $a^4$, to adjust it vertically, for the purpose of regulating the file-holder D' to correspond with the differences in sizes of teeth in various saws. The front box, $a'$, is provided with a flange slotted at $x$, and provided with a set-screw, $f$, for regulating the spread of the files.

F F represent two springs, the front ends of which hook over the holders D D', and their rear ends are secured in the sides of the frame A. G G represent hooked detent-rods, which pass through the sides of the frame A and hook over the springs F F, the outer ends of rods G being provided with screw-nuts $g$ $g$, for regulating the length of said rods G G, and thereby controlling the tension of the springs F F, so as to make the files cut fast or slow, as desired.

H represents a rocking or vibrating feed-shaft, having centrally secured thereto and projecting forward a hook-shaped arm, $h$, which engages with the teeth of the saw for intermittently turning it to bring the teeth in contact with the files one after another. This feed-shaft is rocked or vibrated by means of a rod, I, which a stud, $i$, on the gear-wheel B engages at each revolution, depressing the rod, which rocks or vibrates the shaft H and raises the arm $h$ to engage with the teeth of the saw. The shaft is provided with vertical arms J J, which engage with and press against the outer sides of the file-holders, pressing them toward each other as the shaft H is vibrated, and as said file-holders cross each other the files are thrown away from the saw when the saw is being turned to bring another tooth in position.

K represents a vertically-adjustable block, secured to the inner side of the frame A by a set-screw, $k$, the object of said block being to regulate the stroke of the rod I, and thus regulate the movement of the saw according to the size and number of the teeth.

The operation of my improved machine is as follows: The gin-saws are mounted on a revolving shaft in front and under the files, in the usual manner, when, by turning the shaft B, the crank-shaft will be turned through the medium of the gears B' C, thus reciprocating the files across the teeth of the saw at each revolution of the shaft B, and at each revolution thereof the saw is turned so as to bring the teeth successively in position to be operated on.

Having thus described my invention, what I claim as new, and desire to secure by Letters Patent, is—

1. The mechanism for intermittently turning a saw and clearing the files, consisting of the rock-shaft H, provided with the feeding-arm h, vertical arms J J, and rod I and wheel B′, provided with a stud, i, for depressing the rod I at each revolution, substantially as shown and described.

2. The combination, with the feeding mechanism, of the vertically-adjustable block K, for regulating the stroke of the arm or rod I, substantially as set forth.

3. The combination, with the file-holders D D′, of the hook-shaped springs F F, engaging with said holders, and the laterally-adjustable hooked rods engaging with said springs, substantially as herein shown and described.

JACOB HARTSEL.

Witnesses:
HENRY W. HILL,
ALICE G. HILL.